(12) United States Patent
Jones et al.

(10) Patent No.: US 6,987,579 B1
(45) Date of Patent: Jan. 17, 2006

(54) READ ONLY PRINTER (ROP) CAPABILITIES ON A CSN PLATFORM

(75) Inventors: Jerrald W. Jones, Marietta, GA (US); Ronald K. Thomas, Royal Palm Beach, FL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 900 days.

(21) Appl. No.: 09/822,884

(22) Filed: Mar. 30, 2001

(51) Int. Cl.
*G06F 3/12* (2006.01)
*G06K 15/02* (2006.01)

(52) U.S. Cl. .................. 358/1.15; 710/10; 710/38; 379/221.09

(58) Field of Classification Search .............. 358/1.15; 379/221.09, 221.1, 221.03; 710/8, 10, 38, 710/104; 717/162, 120
See application file for complete search history.

(56) References Cited

U.S. PATENT DOCUMENTS

RE36,394 E * 11/1999 Advani et al. .............. 713/100

OTHER PUBLICATIONS

Declaration of Jerrald W. Jones dated Aug. 27, 2002.

* cited by examiner

*Primary Examiner*—King Y. Poon
*Assistant Examiner*—Lucas Divine
(74) *Attorney, Agent, or Firm*—Potomac Patent Group PLLC

(57) ABSTRACT

A system and method for linking an ROP (Read Only Printer) to a CSN (Compact Service Node) platform at a telecommunication facility. The UNIX software for the CSN may be modified so as to enable the ROP option and also to recognize the external printer attached to the CSN. An unassigned port at the CSN may be used to connect the ROP to the CSN. Therefore, no hardware modifications to the CSN architecture may be necessary. The user (e.g., a technician) may instruct the CSN to print the user-selected data that may include a variety of messages (e.g., telephone service subscriber data, error messages, diagnosis/troubleshooting reports, subscriber communication data, etc.) generated by the CSN. Thus, in addition to viewing the messages, the technician may direct the messages to an external printer for a hard copy of the data. Alternatively, instead of the ROP, the technician may connect a laptop computer to the printer port at CSN and capture and store all the messages from the CSN for later processing.

13 Claims, 3 Drawing Sheets

READ ONLY PRINTER (ROP) CAPABILITIES ON A CSN PLATFORM

BACKGROUND OF THE INVENTION

1. Field of the Invention

The present invention broadly relates to telecommunication devices, and, more particularly, to a compact service node (CSN) capable of supporting a read only printer (ROP).

2. Description of the Related Art

Modern telecommunication networks (e.g., a wireless telephone network, a PSTN (Public Switched Telephone Network), etc.) employ complex signaling and signaling protocols. Furthermore, the services provided by commercial telecommunication networks to their subscribers (e.g., residential telephone customers or mobile telephone users) have gradually become more sophisticated and user-friendly. With the support of advanced signaling protocols, the transfer of information among network nodes has resulted in creation of intelligent networking. The term "intelligent networking" may be used for a method for providing and interpreting information within a distributed network. A distributed network, on the other hand, is structured such that the network resources are distributed throughout the geographic area being served by the network. A distributed network is considered to be "intelligent" if the service logic and functionality can occur at the distributed nodes in the network. For example, mobile telecommunications networks (e.g., cellular telephone networks) can be considered distributed and intelligent.

A compact service node (CSN) is an intelligent peripheral (IP) or node in an intelligent network platform. The CSN may be similar to a desktop computer system, but with advanced technical features. A CSN may be a smaller version of an SN (Service Node). A CSN/IP platform may be installed in a telecommunication service provider's (or a telecommunications network operator's) central offices and administrative centers. The CSN/IP platform enables the service provider (or the network operator) to offer its customers advanced features such as, for example, voice-activated dialing, message delivery service, intelligent personal agent, customer privacy management, etc. For example, the message delivery service calls the customer to deliver basic information about calls that have come in. The intelligent personal agent follows a customer's spoken instructions to forward calls to another number, take a message or place a call. Business customers can use the CSN/IP platform to access and update a set of announcements tailored to meet their individual needs automatically and without expensive manual procedures. Furthermore, the CSN/IP platform may support voice, data messaging and multimedia features so that a service provider can quickly combine and integrate wireless, wireline or Internet Service Provider's (ISP's) network and deliver services such as speech recognition, text-to-speech conversion, fax services, and recorded announcements. The CSN/IP platform's support of Internet protocols may enable the platform to bridge voice and data networks. For example, information from the Internet can be retrieved and delivered to anyone on the telephone. Conversely, voice calls and data from the switched network (e.g., the PSTN) can be delivered to emerging data networks (e.g., a wireless data network).

Different manufacturers may provide a different set of features/functionalities as part of their CSN/IP platforms. For example, the CSN/IP platform provided by Lucent Technologies of Murray Hill, New Jersey, USA, may include: (1) One or more compact service nodes or intelligent peripherals that recognize and respond to customer requests for services. The CSN may support all brands of wireline and wireless call-routing switches in a service provider's network; (2) an Intelligent Peripheral (IP) Manager that collects and stores digitized information about services available to each customer of the service provider; and (3) a Service Control Point (SCP) that is an intelligent database server that works in conjunction with the CSN to collect information about calls and tell the IP Manager how to handle each call.

FIG. 1 shows the front view of an exemplary prior art SCP unit 10. The front view shown in FIG. 1 is for the Advantage Model-II SCP manufactured by Lucent Technologies. The SCP 10 in FIG. 1 is shown to include, among other modules, a Power Distribution Unit (PDU), two modem banks—one for "upper" modems and one for "lower" modems, two Fuse Filter units, one or more disk media drives, a group of cooling units, a pair of servers for telecommunication applications, two TS (Telecom Server) hubs, and an ARU (Alarm Relay Unit). A TS hub is a single location for all the communication wiring from Telecom Servers to be terminated at and routed to other locations in the telecommunication network. An alarm relay unit is a small electronic box that collects alarm conditions from various system devices (e.g., CSN's, SCP's, or SN's) and provides an audible alarm tone. Additionally, the SCP 10 in FIG. 1 has two Control Computer Units (CCU's) that are the "brains" of the SCP. The two CCU's are cabled up to a Reliable Control Unit (RCU) that contains hardware that is designed for system maintenance. It is noted that any cabling between various modules of the SCP 10 and from/to the SCP 10 to/from another device are not illustrated in FIG. 1. On the back of the RCU are Distribution Modules or boards (not shown) where cables are plugged into to provide communication to other devices. One of the devices that could be connected to the SCP 10 is an ROP (Read Only Printer). The software supplied by Lucent Technologies with the SCP 10 provides the capability of sending information from the SCP 10 to the ROP (not shown).

An Advantage SN (Service Node) from Lucent Technologies uses the same hardware modules shown in FIG. 1. However, the software for the Advantage SCP is different from the software for the Advantage SN because of different applications the two devices are meant to perform. In any event, the Advantage SN is also capable of supporting the ROP. The UNIX-based software operating the SCP (or the SN) and the hardware path (connecting the ROP to the device) developed by Lucent enables the SCP (or SN) to send information to the attached ROP, thereby allowing a technician or other authorized person to print required data and messages as part of network maintenance and troubleshooting.

However, similar ROP support may not be available for a CSN/IP platform. For example, the CSN/IP platform supplied by Lucent Technologies does not have printer capabilities. It is therefore desirable to configure such a CSN to make it capable of supporting an ROP. It is further desirable to be able to attach an ROP to a CSN so that a user (e.g., a technician in the service provider's network) can print desired messages and data (related to, for example, customer service notifications, error messages, customer usage traffic, etc.) from the CSN to the ROP. An ROP-capable CSN thus provides a print option (in addition to the display option) while servicing and troubleshooting a customer's account, and also facilitates maintenance activities by technical service personnel in the service provider's network.

SUMMARY OF THE INVENTION

In one embodiment, the present invention contemplates a method of linking a read only printer (ROP) to a CSN (Compact Service Node) platform at a telecommunication facility. The method comprises identifying a physical location of an unassigned hardware port on the CSN platform where the ROP is to be connected; locating a first software identification for the unassigned hardware port in one or more program instructions for the CSN platform, wherein the first software identification indicates how the unassigned hardware port is labeled in the one or more program instructions; locating a second software identification in the one or more program instructions, wherein the second software identification indicates a destination where data to be printed during operation of the CSN are to be sent by the one or more program instructions; and modifying the one or more program instructions so as to link the second software identification with the first software identification, thereby allowing the one or more program instructions to recognize the unassigned hardware port as the destination for the data to be printed.

In another embodiment, the present invention contemplates a telecommunication facility that comprises a read only printer (ROP) having a data input port; and a compact service node (CSN) having a hardware port configured to be connected to the data input port at the ROP via a printer cable, wherein the printer cable is configured to transmit data from the hardware port to the data input port at the ROP, and one or more program instructions stored in a memory for the CSN, wherein the one or more program instructions are configured to have: a first software identification linked with a second software identification so as to allow the one or more program instructions to recognize the hardware port as a destination for data to be printed during operation of the CSN, wherein the first software identification indicates how the hardware port is labeled in the one or more program instructions, and wherein the second software identification indicates the destination, and an ROP entry enabled in the one or more program instructions, thereby activating printer capability of the one or more program instructions.

In a still further embodiment, the present invention contemplates a CSN (Compact Service Node) platform at a telecommunication facility. The CSN platform includes an RS232 port configured to be connected to a data input port at a read only printer via a printer cable, wherein the printer cable is configured to transmit data from the RS232 port to the data input port at the ROP; and one or more program instructions stored in a memory for the CSN platform, wherein the one or more program instructions are configured to have: a first software identification linked with a second software identification so as to allow the one or more program instructions to recognize the RS232 port as a destination for data to be printed during operation of the CSN platform, wherein the first software identification indicates how the RS232 port is labeled in the one or more program instructions, and wherein the second software identification indicates the destination, and an ROP entry enabled in the one or more program instructions, thereby activating printer capability of the one or more program instructions.

The CSN platform according to the present invention has capability to support an ROP to print user-selected data. The UNIX software for the CSN may be modified so as to enable the ROP option and also to recognize the external printer attached to the CSN. An unassigned port at the CSN may be used to connect the ROP to the CSN. Therefore, no hardware modifications to the CSN architecture may be necessary. The user (e.g., a technician) may instruct the CSN to print the user-selected data that may include a variety of messages (e.g., telephone service subscriber data, error messages, diagnosis/troubleshooting reports, subscriber communication data, etc.) generated by the CSN. The availability of the printing option adds to the display functionality currently supported at the CSN. Thus, in addition to viewing the messages, the technician may direct the messages to an external printer for a hard copy of the data. Alternatively, instead of the ROP, the technician may connect a laptop computer to the printer port at CSN and capture and store all the messages from the CSN for later processing.

BRIEF DESCRIPTION OF DRAWINGS

Further advantages of the present invention may be better understood by referring to the following description taken in conjunction with the accompanying drawings, in which.

DETAILED DESCRIPTION OF PREFERRED EMBODIMENTS

Figure 1:
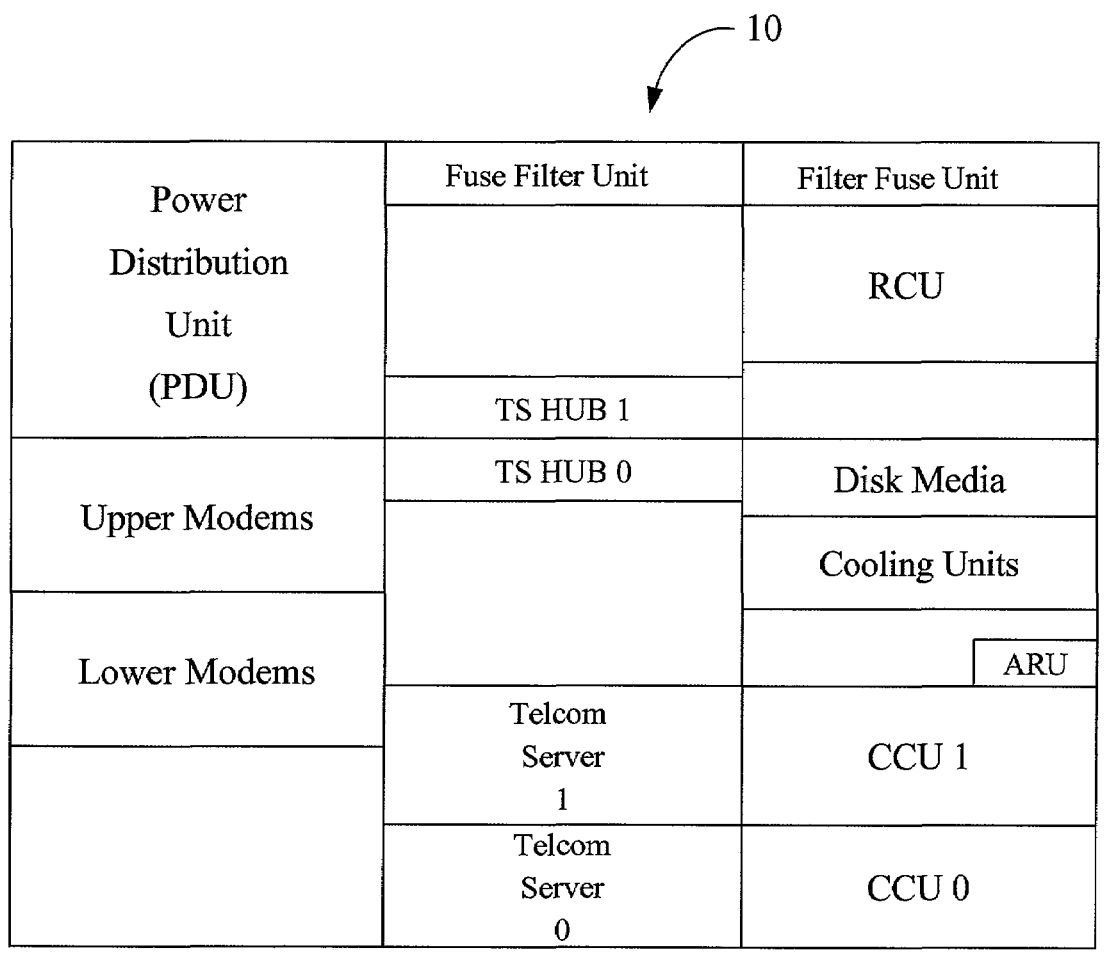
FIG. 1 shows the front view of an exemplary prior art SCP (Service Control Point) unit.
Figures 2, 3:
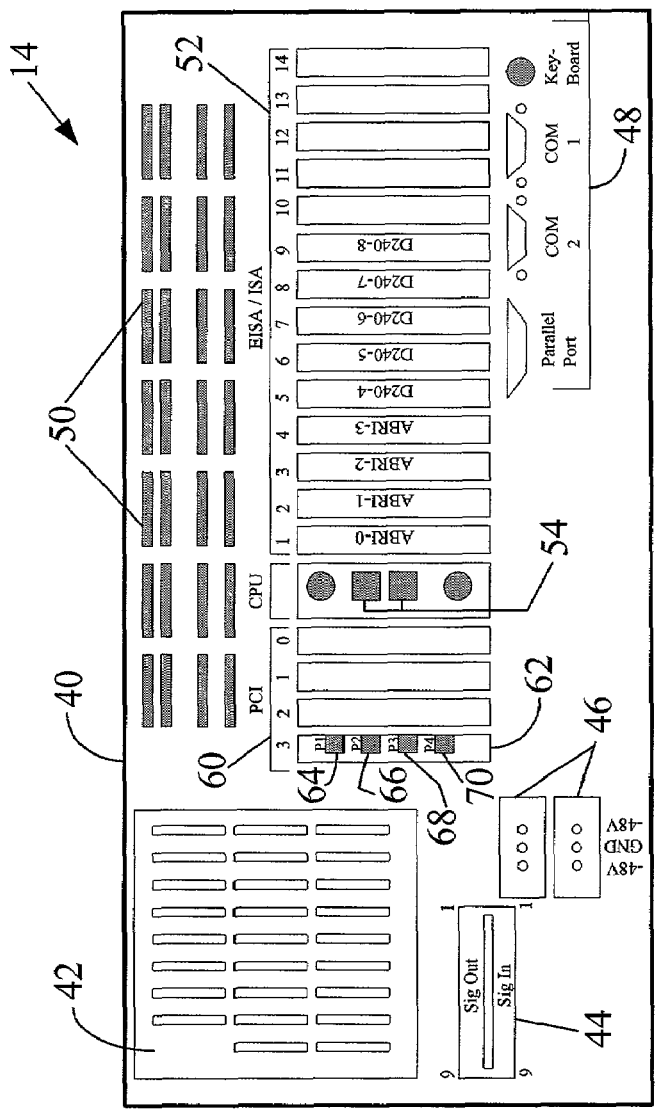
FIG. 2 is a block diagram illustrating an exemplary CSN (Compact Service Node) bay supporting five individual CSN's.
FIG. 3 shows the details of the back of a CSN illustrated in FIG. 2.
Figure 4:
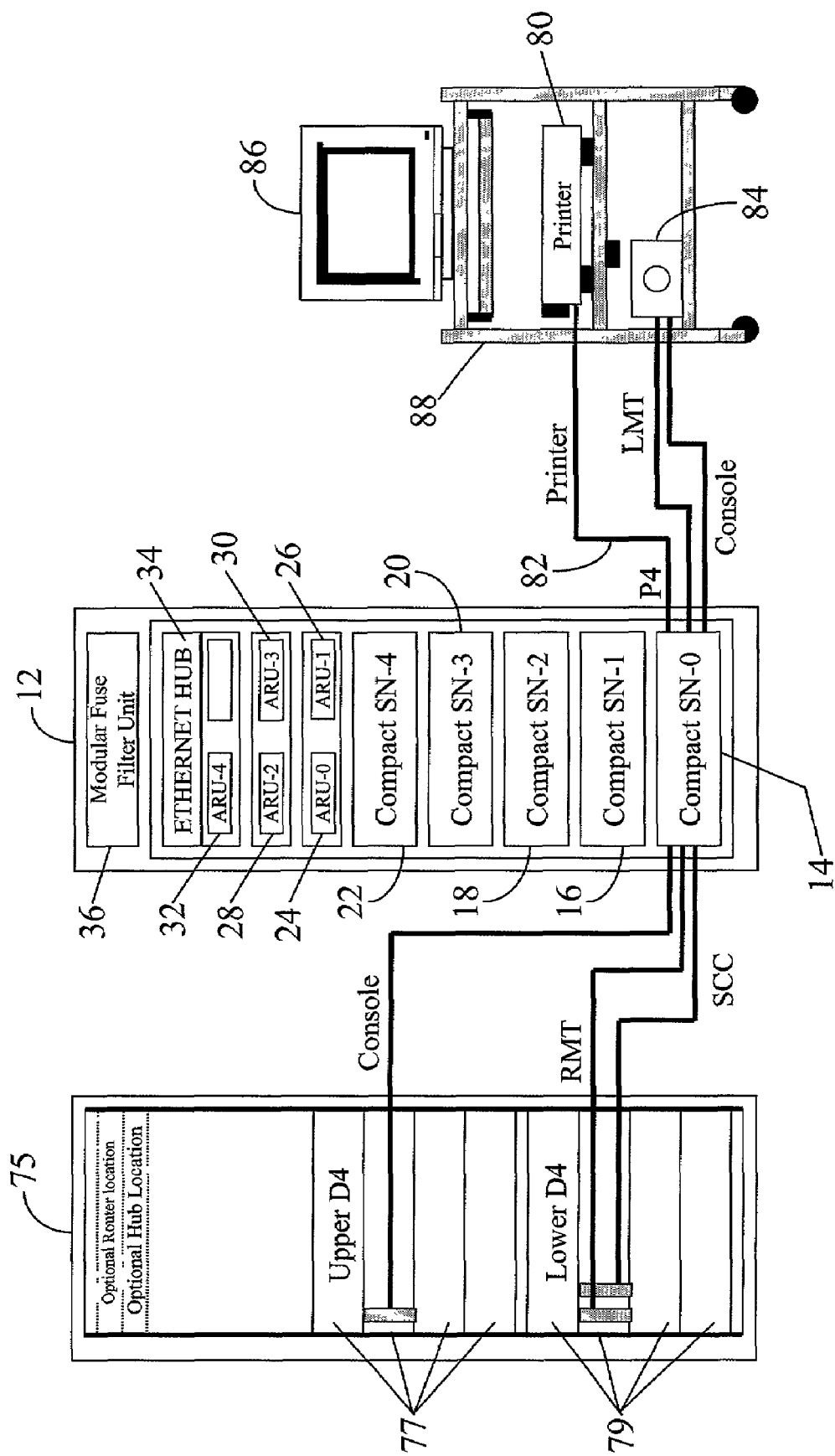
FIG. 4 depicts how an ROP (Read Only Printer) is connected to a CSN shown in FIG. 2 according to one embodiment of the present invention.

FIG. 2 is a block diagram illustrating an exemplary CSN (Compact Service Node) bay 12 supporting five individual CSN's 14, 16, 18, 20, and 22. In the embodiment illustrated in FIG. 2, all five CSN's 14–22 are identical units. For example, each CSN 14–22 may be the CSN-plus (CSN+) model manufactured by Lucent Technologies. However, in an alternative embodiment, the five CSN's may be different versions of CSN's. For example, the CSN 18 may be a later (or more advanced) version of CSN 14. In FIG. 2, each CSN 14–22 in the CSN bay 12 has its own cable coming off the back of the respective CSN box 14–22 and going to the attached printer (not shown). FIG. 4 illustrates one such arrangement for the CSN 14. In addition to CSN boxes 14–22, the CSN bay 12 may also include one or more ARU (Alarm Relay Unit) units/modules (here, five ARU's 24, 26, 28, 30, and 32); an Ethernet hub 34 for network applications, and a modular fuse filter unit 36. In the preferred embodiment, the CSN bay 12 is the ACSNC-0 (Advantage Compact Service Node Cabinet) cabinet supplied by Lucent Technologies. The CSN's 14–22 are mounted in the ACSNC-0 cabinet. It is noted that the discussion hereinbelow focuses on the CSN's supplied by Lucent Technologies. However, the methodology discussed hereinbelow to make a CSN capable of ROP (Read Only Printer) support may also apply to CSN's manufactured by other communications solutions providers.

FIG. 3 shows the details of the back of a CSN (i.e., the CSN 14) illustrated in FIG. 2. As noted hereinabove, the rear panel 40 may be identical for each of the other four CSN's 16–22 shown in FIG. 2. The rear panel 40 includes a number of vents 42 for a power supply fan assembly, an external alarm I/O connector slot 44, a pair of redundant (−48V DC) power input connectors 46, four peripheral ports 48 (including one parallel port, one COM-1 port, one COM-2 port, and a keyboard port), a number of air exhaust vents/slots 50, fourteen (14) EISA/ISA (Extended Industry Standard Architecture/Industry Standard Architecture) external access slots 52 to receive external peripheral circuit boards, two Ethernet ports 54, and four PCI (Peripheral Component Interconnect) slots 60. In FIG. 3, the fourth PCI slot (i.e., slot # 3) is shown to contain an RS-232 card 62 having four ports—P1 (64), P2 (66), P3 (68), and P4 (70). Thus, each of these four ports P1–P4 supports serial data communication. The first port 64 is provided for the SCC (Switching Control Center) link, the second port 66 is provided for the RMT (Remote Maintenance Terminal) link, and the third port 68 is provided for an external alarm interface. The SCC link may be used to send alarm messages to a remote alarm monitoring center, and also to receive commands sent by the remote monitoring center to retrieve information from the Lucent equipment (here, the CSN 14). The RMT link is provided for the customer (e.g., a technician working for the telephone service provider) to connect to any type of modem that would allow remote access to the corresponding equipment (here, the CSN 14). However, the fourth port 70 (i.e., port P4) is unassigned or not used by Lucent in the CSN 14. The present invention makes use of this unassigned port (i.e., port P4) to attach and operate an external ROP as discussed hereinbelow with reference to FIG. 4.

FIG. 4 depicts how an ROP (Read Only Printer) 80 is connected to a CSN shown in FIG. 2 (i.e., the CSN 14) according to one embodiment of the present invention. As noted hereinbefore, each of the remaining CSN's (i.e., CSN's 16–22) may be similarly connected to the printer 80 and also to other devices (e.g., console 86) shown in FIG. 4. The CSN 14 is shown connected to an AMC 75 (Advantage Miscellaneous Cabinet) having four upper drawers 77 and four lower drawers 79. The AMC 75 is an empty cabinet that may be used to mount devices that may be used with the CSN bay 12 or similar other Lucent Advantage series equipment. Each CSN 14–22 may provide the display functionality—i.e., to display various messages and data generated in the service provider's network on a computer monitor or terminal attached to the CSN. Here, the CSN 14 is shown connected to a console link in one of the upper drawers 77, and also to a console link in the signal box 84 via one or more of the peripheral ports 48. Thus, for example, the user can connect a video display unit or terminal (e.g., the computer monitor 86) to the signal box 84 as a console to view thereon the data or messages received from the CSN 14. In addition to the console connections, the CSN 14 is also shown connected to an RMT link (through the P2 port 66, FIG. 3) and an SCC link (through the P1 port 64, FIG. 3) in one of the lower drawers 79 in the AMC 75. Furthermore, the CSN 14 may also be connected to an LMT (Local Maintenance Terminal) link in the signal box 84. The LMT link may typically be connected to a terminal in the service provider's office for the local technicians to work on the respective equipment (here, the CSN 14). An external keyboard (not shown) may also be attached to the CSN 14 to transmit commands/messages thereto and also to view such commands and messages on the attached computer terminal (e.g., the monitor screen 86). Furthermore, the CSN 14 may also be connected to a parallel device (e.g., a zip drive or a similar data storage drive) through the CSN's parallel port (shown in FIG. 3). The peripheral devices (e.g., the monitor 86, the printer 80, etc.) may be placed on a device cart 88 for ease of handling and operation.

In the embodiment shown in FIG. 4, the printer 80 is connected to the CSN 14 using a straight RJ45 to RS232 cable with a null modem adapter on the RS232 end of the cable. The CSN 14 has an RJ45 connector configuration on the P4 port 70, and the printer 80 accepts RS232 connector configuration. The null modem adapter converts the straight-through wired cable into a null modem "cross-wired" configuration that is suitable for serial data transfer between the CSN 14 and the printer 80. The null modem adapter treats the CSN 14 as a data transmitter and the printer 80 as a data receiver and "flip flops" the transmit and receive channels to transfer data from CSN 14 to the printer 80. The null modem adapter can be obtained from any manufacturer of computer cables and accessories. The physical connection of the printer 80 to the CSN 14 may be accomplished either before or after the UNIX-level software change described hereinbelow. It is noted that any serial printer (e.g., Epson® or Panasonic® printers) may be connected to the P4 port 70. Alternatively, a laptop computer may also be connected to the P4 port 70, in place of an ROP, to capture and store printable messages and data.

It is noted that the UNIX level software supplied by Lucent Technologies as part of the operating and application software for the CSN 14 sends any information that was addressed to an ROP to a location "/dev/term/rop" in the software. In other words, when a user instructs the CSN 14 to print certain data, the software for CSN 14 identifies the data to be printed and sends the data to the location "/dev/term/rop". However, the unused RS232 port (i.e., the P4 port 70) is labeled as "/dev/dty/a004s" in the "/dev/dty/" directory in the UNIX software for the CSN 14. Therefore, a symbolic link command needs to be used to link the ROP location in UNIX to the unused RS232 port 70 so that any information sent to the ROP (i.e., data to be printed) would go to the P4 port 70 on the RS232 card 62. In UNIX, the symbolic link command can be given as "1n-s/dev/dty/aOO4s/dev/term/rop".

After linking the software ROP location to the corresponding hardware port where the actual printer is connected, the ROP functionality in the UNIX software is enabled by editing the "/sn/init" file. The Lucent-supplied UNIX level software has ROP functionality disabled in it. Therefore, the "/sn/init" file is edited to verify the presence of the ROP entry therein and then to remove the "#" parameter in front of the ROP entry to activate the ROP capabilities of the software. The following is a sample of the ROP, SCC, and Alarm entries in the "/sn/init" file:

---

```
--ROP
msgh_name=ROP run_lvl=31 path=/sn/cr/rop user_id=612
restart_threshold=6 restart_interval=300
procinit_timer=45

#--SCC
#msgh_name=SCC run_lvl=31 path=/sn/cr/scc user_id=612
#sanity_timer=120 restart_threshold=9 restart_interval=60 msgh_qid=7
#procinit_timer=45

#--ALARM
#msgh_name=ALARM run_lvl=31 path=/sn/cr/alarm
user_id=612 msgh_qid=8
#procinit_timer=45

```

---

As can be seen from the above UNIX code, the "#" parameter in front of the ROP entry is removed to activate the CSN's 14 printing capability. The "#" parameter may remain in front of the SCC or the Alarm entries as given hereinabove.

In the CSN+model, the location of the fourth RS232 port (i.e., the P4 port 70) is changed from the "/dev/dty/" directory to the "/dev/term" directory in the UNIX software. Also, the physical name of the port is changed from "aOO4s" to "r0d". Therefore, the symbolic link may be created from "/dev/term/r0d" to "/dev/term/rop". The remaining procedures including the physical connection of the CSN+ to the printer 80 with the RJ45-RS232 cable and a null modem adapter, and the editing of the "/sn/int" file to enable the ROP entry remain the same for the CSN+model.

The foregoing describes exemplary embodiments of a CSN platform having capability to support an ROP to print user-selected data. The UNIX software for the CSN may be modified so as to enable the ROP option and also to recognize the external printer attached to the CSN. An unassigned port at the CSN may be used to connect the ROP to the CSN. Therefore, no hardware modifications to the CSN architecture may be necessary. The user (e.g., a technician) may instruct the CSN to print the user-selected data that may include a variety of messages (e.g., telephone service subscriber data, error messages, diagnosis/troubleshooting reports, subscriber communication data, etc.) generated by the CSN. The availability of the printing option adds to the display functionality currently supported at the CSN. Thus, in addition to viewing the messages, the technician may direct the messages to an external printer for a hard copy of the data. Alternatively, instead of the ROP, the technician may connect a laptop computer to the printer port at CSN and capture and store all the messages from the CSN for later processing.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended

What is claimed is:

1. A method of linking a read only printer (ROP) to a CSN (Compact Service Node) platform at a telecommunication facility, said method comprising the steps of:
    identifying a physical location of an unassigned hardware port on the CSN platform where said ROP is to be connected;
    locating a first software identification in a /dev/dty/ directory for said unassigned hardware port in one or more program instructions for said CSN platform, wherein said first software identification indicates how said unassigned hardware port is labeled in said one or more program instructions and wherein said first software identification is "r0d" in the /dev/dty/ directory;
    locating a second software identification in said one or more program instructions, wherein said second software identification indicates a destination where data to be printed during operation of said CSN are to be sent by said one or more program instructions; and
    modifying said one or more program instructions so as to link said second software identification with said first software identification, thereby allowing said one or more program instructions to recognize said unassigned hardware port as said destination for said data to be printed.

2. The method of claim 1, further comprising the steps of: connecting said ROP to said unassigned hardware port via a printer cable, wherein said printer cable is configured to transmit data from said unassigned hardware port to a data input port at said ROP.

3. The method of claim 1, further comprising the steps of: enabling an ROP entry present in said one or more program instructions, thereby activating printer capability of said one or more program instructions.

4. The method of claim 1, wherein said one or more program instructions are stored in a memory for said CSN platform.

5. The method of claim 1, wherein said CSN platform is a Lucent® CSN-plus (CSN+) platform.

6. The method of claim 1, wherein said one or more program instructions are in the UNIX programming language.

7. The method of claim 1, wherein said unassigned hardware port is an RS232 port.

8. A telecommunication facility comprising:
    a read only printer (ROP) having a data input port; and
    a compact service node (CSN) having:
        a hardware port configured to be connected to said data input port at said ROP via a printer cable, wherein said printer cable is configured to transmit data from said hardware port to said data input port at said ROP, and one or more program instructions stored in a memory for said CSN, wherein said one or more program Instructions are configured to have:
            a first software identification linked with a second software identification so as to allow said one or more program instructions to recognize said hardware port as a destination for data to be printed during operation of said CSN, wherein said first software identification indicates how said hardware port is labeled in said one or more program instructions, wherein said first software identification is "r0d" in a /dev/dty/ directory, and wherein said second software identification indicates said destination, and
            an ROP entry enabled in said one or more program instructions, thereby activating printer capability of said one or more program instructions.

9. The telecommunication facility of claim 8, wherein said CSN is a Lucent® CSN+.

10. The telecommunication facility of claim 8, wherein said one or more program instructions are in the UNIX programming language.

11. The telecommunication facility of claim 8, wherein said hardware port is an RS232 port.

12. A CSN (Compact Service Node) platform, at a telecommunication facility, wherein said CSN platform includes:
    an RS232 port configured to be connected to a data input port at a read only printer via a printer cable, wherein said printer cable is configured to transmit data from said RS232 port to said data input port at said ROP; and
    one or more program instructions stored in a memory for said CSN platform, wherein said one or more program instructions arc configured to have:
    a first software identification linked with a second software identification so as to allow said one or more program instructions to recognize said RS232 port as a destination for data to be printed during operation of said CSN platform, wherein said first software identification indicates how said RS232 port is labeled in said one or mom program instructions, wherein said first software identification is "r0d" in a /dev/dty/ directory, and wherein said second software identification indicates said destination, and an ROP entry enabled in said one or more program instructions, thereby activating printer capability of said one or more program instructions.

13. The CSN platform of claim 12, wherein said one or more program instructions are in the UNIX programming language.

* * * * *